United States Patent [19]

Souza

[11] 4,144,667
[45] Mar. 20, 1979

[54] SELF-LOCKING DISPOSABLE RODENT TRAP

[75] Inventor: Anthony J. Souza, Lancaster, Pa.

[73] Assignee: Woodstream Corporation, Lititz, Pa.

[21] Appl. No.: 814,835

[22] Filed: Jul. 11, 1977

[51] Int. Cl.² ............................................. A01M 23/18
[52] U.S. Cl. ....................................................... 43/61
[58] Field of Search ............................... 43/60, 61, 67

[56] References Cited

U.S. PATENT DOCUMENTS

| | | | |
|---|---|---|---|
| 1,541,639 | 6/1925 | Gregory | 43/67 |
| 1,625,027 | 4/1927 | Hulse | 43/61X |
| 1,726,493 | 8/1929 | Kelley | 43/67 |
| 2,195,484 | 4/1940 | George | 43/67 X |
| 3,348,331 | 10/1967 | Williams | 43/61 |
| 3,975,857 | 8/1976 | Branson et al. | 43/61 |

*Primary Examiner*—Al Lawrence Smith
*Assistant Examiner*—James G. Smith
*Attorney, Agent, or Firm*—Holman & Stern

[57] ABSTRACT

A single use disposable animal trap particularly suited for entrapment of rodents and the like, the invention comprises a housing of dimensions only slightly greater than the site of the animal which is to be trapped, the housing having an entrance opening and a pivoting inclined plane mounted internally of the housing. An animal entering the trap biases a rear portion of the inclined plane downwardly, a forward portion of the inclined plane thereby camming a door member into place over the entrance opening. In a preferred embodiment, a shoulder-like detent formed on the inner wall of the door member abuts a forward edge portion of the inclined plane, thereby to maintain the door member in place over the entrance opening and to prevent escape of the animal from the trap.

9 Claims, 7 Drawing Figures

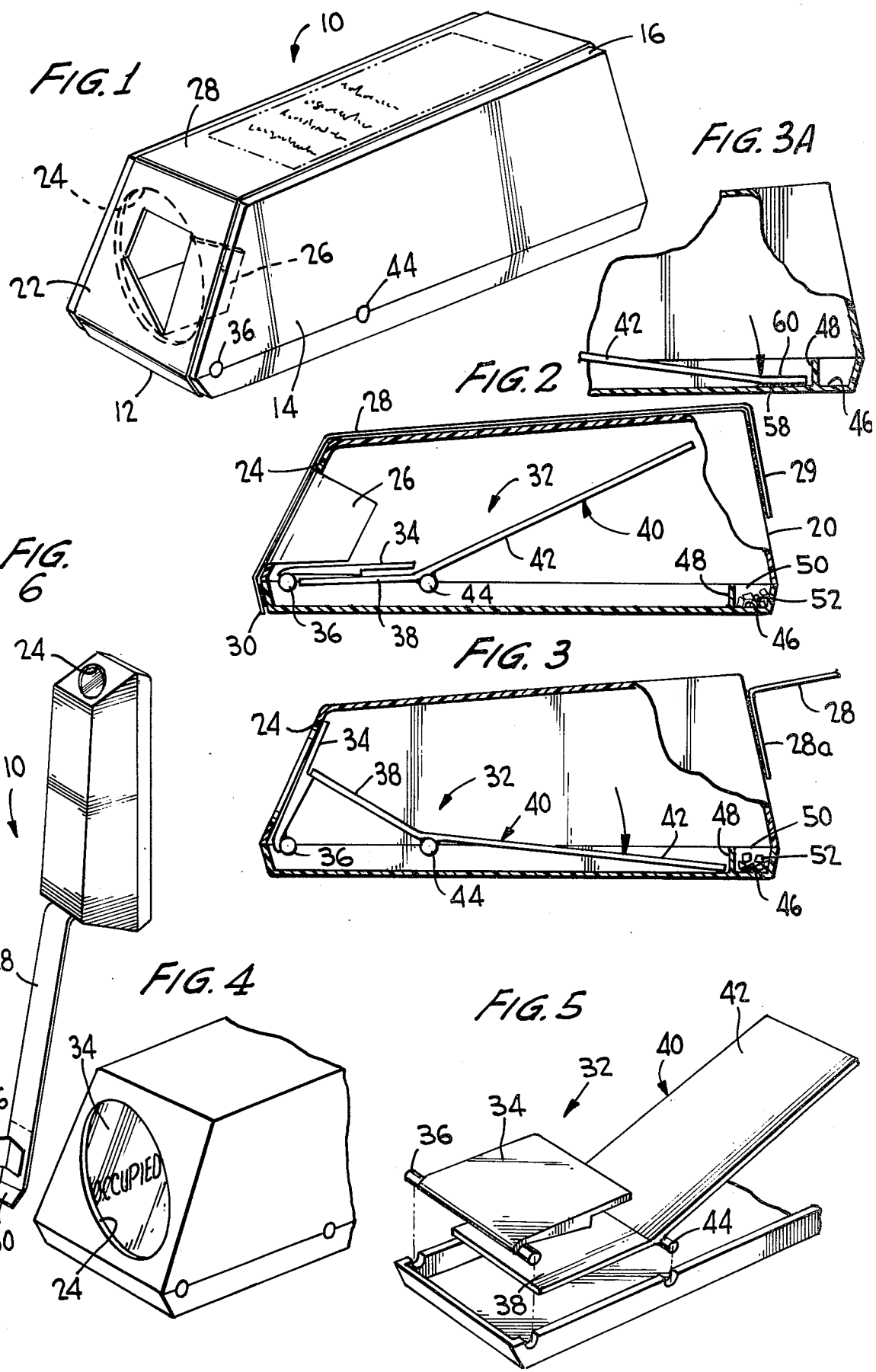

SELF-LOCKING DISPOSABLE RODENT TRAP

BACKGROUND OF THE INVENTION

1. Field of the Invention

The invention relates generally to animal traps and particularly to rodent traps adapted to single use entrapment of mice and rats, the trap and contained animal being disposable.

2. Description of the Prior Art

Although efficient rodent traps have long been available, the more common of such traps use spring-actuated levers which usually mutilate the body of the animal to the degree that unsightly and unsanitary conditions are caused to exist. While such traps have wide utility and are quite satisfactory for most purposes, some individuals have great difficulty in handling a trap of this nature because of the fear of setting the spring mechanism. Moreover, in some environments, such as restaurants or the like, the sight of a trap with a dead mouse or rat is obviously undesirable. A need therefore exists for a trap which humanely traps an animal without creating unsightly and unsanitary conditions in the process, especially when the trap is utilized in the home or in restaurants and the like where the trap may not be checked for a period of time sufficient to allow the spread of offensive odors or the attraction of undesirable vermin, such as, for example, flies or other insects. A need also exists for a trap which, when a rodent has been entrapped therein, can be readily disposed of even by those who have a psychological repulsion to the handling of animals, particularly deceased rodents.

Exemplary of prior trap apparatus for the entrapment of rodents and the like is the patent to Bowen, U.S. Pat. No. 730,434, which discloses an inclined plane to close an entrance opening. The Bowen patent does not disclose structure for locking the inclined plane or associated door closure structure into a position blocking the entrance opening once the animal has become entrapped. Further, the prior art including Bowen does not provide an essentially single use trap which can be disposed of along with the entrapped animal, the trap holding the animal without direct physical damage to the body of the animal such as could tend to produce odor-causing or unsanitary conditions.

SUMMARY OF THE INVENTION

The present trap structure provides a rodent trap having a housing defining an enclosure, the housing further having an entrance opening into the enclosure with a door pivotally mounted to the housing for closing the entrance opening. The floor of the enclosure is defined by the upper surface of an inclined plane having a forward portion and a rear portion, the said portion being disposed at an angle to each other and being mounted for pivotal movement on the housing at the intersection of the portions. The weight of an animal entering the trap biases the rear portion of the inclined plane downwardly, thereby causing the forward portion of the inclined plane to move upwardly to cam the door into a blocking position over the entrance opening. The door has a shoulder-like detent formed thereon which abuts the forward edge of the forward portion of the inclined plane and prevents movement of the inclined plane. The now stationary inclined plane holds the door over the entrance opening to prevent escape of the entrapped animal.

A disposal strip releasably adheres to the housing and holds a tab member over and within the entrance opening of the trap to prevent actuation of the inclined plane prior to use of the trap, the trap being preferably pre-baited. Removal of the tab member from over the entrance opening allows entrance into the trap of an animal which is to be trapped, the door being closed and locked over the entrance opening as aforesaid. The trap can then be picked up by means of the disposal strip and disposed of such as by placement in a refuse container or the like.

Accordingly, it is an object of the invention to provide an essentially single use animal trap which is disposable with the entrapped animal without the need for touching the trap or the entrapped animal.

It is a further object of the invention to provide a disposable animal trap which can be pre-baited and sealed until ready for use.

It is another object of the invention to provide an animal trap having an internal inclined plane formed of angled forward and rear portions, the animal causing pivotal movement of the inclined plane on contact with the rear portion thereof, the forward portion of the inclined plane biasing a door into blocking position over an entrance opening into the trap, the door having a detent formed thereon to prevent movement of the inclined plane from blocking relation to the door.

BRIEF DESCRIPTION OF THE DRAWINGS

FIG. 1 is a perspective view of the present trap prior to removal of the adhesive strip and closure tab, that is, as the trap would be configured prior to use in a trapping capacity;

FIG. 2 is a side elevation of the trap of FIG. 1;

FIG. 3 is a side elevation of the trap on removal of the closure tab from the entrance opening of the trap;

FIG. 3A is a detail section of a second embodiment of the invention;

FIG. 4 is a perspective view of a portion of the trap after entry thereinto by an animal;

FIG. 5 is an assembly view of the operating mechanism of the trap; and

FIG. 6 is a perspective view of the trap prior to disposal thereof with an animal entrapped therein.

DESCRIPTION OF THE PREFERRED EMBODIMENTS

Referring now to FIGS. 1 and 2, the present trap is seen at 10 to comprise a housing 12 formed of side walls 14, an upper wall 16, a lower wall 18, a rear wall 20, and a front wall 22. The housing 12 can generally take the form of a rectangular solid or can alternatively have a height at the rear portion thereof which is greater than the height at the forward portion of the housing 12. As shown in the drawings, the side walls 14 take the form of trapezoids, the housing 12 having its greater height at the rear portion thereof in order to better accommodate the animal to be trapped as the animal works its way into the trap. Since the trap 10 is essentially intended as a single use structure, the housing 12 and other structural elements thereof are preferably formed of an inexpensive material such as plastic or the like. The housing 12 can further be formed of separate upper and lower portions as shown in the drawings to facilitate assembly of certain structural elements within said housing.

As can be best seen in FIGS. 1 and 4, the front wall 22 has an entrance opening 24 formed essentially centrally therein, the opening 24 being circular or oval as desired. The front wall 22 preferably slants rearwardly from the lower portion thereof as seen in the drawings. Prior to use of the trap, the entrance opening 24 is effectively blocked by means of an insert tab 26 precut on three sides from an elongated throwaway strip 28, the strip 28 being adhesively attached at least to the upper portion of the rear wall 20 by a secure adhesive material and to the remainder of the housing 12 by a strippable adhesive. The tab 26 partially blocks the entrance opening 24 and thereby prevents entry into the trap 10 by an animal and more importantly precludes premature locking of the internal mechanisms of the trap prior to intended use of the trap which might otherwise occur if the trap were turned over during handling or shipment.

The strip 28 preferably takes the form of a flat, elongated length of paper or the like, the width of the strip 28 being slightly less than the width of the housing 12. Adhesive material may be disposed on the strip 28 only at its two end portions with the strip 28 being stretched tightly around the housing between the two attachment location to cause said strip to fit flushly against the portions of the walls 16, 20, and surmounted by the strip or it may be adhesively secured to the housing throughout its length. The adhesive used to attach the strip 28 to the housing 12 preferably comprises a contact adhesive capable of release on exertion of a shear force to the strip, conventional materials of this type being well known, or a more permanent adhesive could be used on the end 29 to facilitate use of the strip as a handle during disposal of the trap.

As is particularly seen in FIGS. 3 and 6, the strip 28 can be separated from the attachment location on the lower portion of the front wall 22 and pulled around the upper portions of the housing 12 until the body of the strip 28 is substantially disposed to the rear of the trap 10. The strip can then be used after entrapment of an animal to dispose of the trap and the animal enclosed therein. When the strip 28 is removed from the front of the trap 10, the insert tab 26 is withdrawn from the entrance opening 24 to open said opening to entry by an animal which is to be trapped. The extended end portion 30 located at the forward end of the strip 28 can be free of adhesive to facilitate grasping the strip 28 during removal of the tab 26 in the manner shown in FIG. 6.

As can best be seen in FIGS. 2, 3 and 5, the trap 10 comprises an actuation mechanism 32 mounted internally of the housing 12, the mechanism 32 consisting of a door member 34 pivotally mounted by a pivot pin 36 between lower portions of the side walls 14 adjacent the front wall 22. The door member 34 is a substantially square, plate-like structure dimensioned to block the entrance opening 24 from the inner side thereof when pivoted upwardly thereover (as seen in FIG. 3). When the trap 10 is in the "set" position, the strip 28 and tab 26 having been removed from blocking relation to the entrance opening 24, the door member 34 surmounts a forward cam portion 38 of a pivotal trigger 40, the trigger 40 further comprising an inclined plane portion 42. The trigger 40 is pivotally mounted within the housing 12 by a pivot pin 44 which extends between lower portions of the side walls 14 rearwardly of the pivot pin 36. The pivot pins 36 and 44 can be received within apertures 46 in the side walls 14 or can be otherwise mounted to said side walls for pivotal movement. The structure shown in FIG. 5 inter alia provides for the apertues 46 to be formed of semi-circular cut-out portions in separable upper and lower portions of the housing 12, the actuation mechanism 32 being more easily assembled within the housing 12 when said housing is so formed.

The portions 38 and 42 of the pivotal trigger 40 are disposed at an angle to each other, the pivot pin 44 being mounted to said trigger at the juncture of the portion 37 and 42. The forward cam portion 38 is of a length less than that of the inclined plane portion 42, the portion 38 typically being less than half the length of the portion 42. The widths of the portion 38 and 42 are essentially equal and are less than the internal width of the housing 12. When the trap 10 is in the "set" position as aforesaid, the forward cam portion 38 of the trigger 40 lies substantially parallel to the lower wall 18, the door member 34 surmounting said portion 38. As best seen in FIG. 3, the inclined plane portion 42 of the trigger 40 extends rearwardly and upwardly from the pivot pin 44 into the interior chamber defined by the housing 12, the portion 42 extending substantially toward the juncture of the upper wall 16 with the rear wall 20. The angle formed by the portions 38 and 42 to each other is an obtuse angle greater than 135° and less than 180°, the angle preferably being between 150° and 160°. It is to be understood that any angle can be chosen which allows operation of the actuation mechanism 32 as described herein. A bait tray 46 is seen to be integrally formed at the rear portion of housing 12 interior thereof, the tray 46 being defined by adjacent portions of the rear wall 20 and the lower wall 18 in combination with a lateral tray wall 48 and tray side walls 50. A bait 52 intended to attract an animal, such as a rodent, is disposed within the tray 46. The trap 10 is preferably pre-baited when manufactured so that the trap can be set simply by removal of the strip 28 and tab 26 as aforesaid. Since the bait 52 preferably contains an odor-producing substance attractive to rodents or the like, the entrance opening 24 is partially blocked by the strip 28 and tab 26 prior to use in order to preclude entry of an animal before the trap is set. Moreover, the bait preferably includes a conventional rodenticide to poison the animal after capture and insure a quick and humane death.

When an animal enters the trap 10 through the entrance opening 24, access to the bait 12 is blocked by the inclined plane portion 42 of the trigger 40. Thus, the animal is enticed to move rearwardly in the housing 12 onto the inclined plane portion 42. Once the animal (or the majority portion thereof) has moved rearwardly of the pivot pin 44, the weight of said animal on the inclined plane portion 42 causes the trigger 40 to be activated, the inclined plane portion 42 pivoting downwardly within the housing 12. The forward cam portion 38 of the trigger 40 is simultaneously caused to pivot upwardly about the axis defined by the pivot pin 44, the portion 38 camming the door member 34 upwardly about the axis defined by the pivot pin 36. Movement of the inclined plane portion 42 to the floor of the housing 12 causes the door member 34 to close the entrance opening 24 and to prevent the animal from exiting the trap 10. As seen in FIG. 4, a legend can be inscribed on that portion of the door member 34 visible through the entrance opening 24 to alert a user of the trap 10 to the presence of a trapped animal therewithin.

The door member 34 is prevented from movement away from closing relation to the entrance opening 24 due to pressure exerted on the inner wall of said door member by the forward cam portion 38 of the trigger 40. A forward edge 54 of the cam portion 38 abuts a shoulder-like detent 56 formed on the inner wall of the door member. The detent 56 takes the form of a ledge extending laterally across the inner wall of said door member 34 medially between upper and lower edges of said door member, the surface of the ledge forming the detent 56. The detent 56 prevents movement of the trigger 40 from the position shown in FIG. 3, that is, the position whereby the inclined plane portion 42 is disposed proximate to the floor of the housing 12 and the cam portion 38 is blocked by the detent 56 from moving downwardly into a position whereby the door member 34 would not be held over the entrance opening 24. An animal thus entrapped within the housing 12 cannot escape therefrom. A user of the trap 10 can then pick up the trap, such as by use of the strip 28, and dispose of the trap and the animal contained therein such as by disposal in a refuse container. The bait 52 can include a poison so that the animal dies quickly and is not subjected to starvation.

As can be seen in FIG. 3A, an adhesive pad 58 can be disposed on the floor of the housing 12 at the portion thereof where the rearward edge portion of the inclined plane portion 42 of the trigger 40 contacts said floor. The adhesive pad 58 adheres to the lower surface of the inclined plane portion 42 to hold the trigger 40 in the position shown in FIG. 3. The rearward edge portion of the inclined plane portion 42 can be angled from the body of said portion 42 as seen at 60 to provide a substantially planar surface of greater surface area to which the pad 58 of adhesive material can more readily adhere. Thus, the adhesive pad 58 provides an alternative means for maintaining the door member 34 in blocking relation to the opening 24.

The invention can be practiced other than as specifically described hereinabove without departing from the scope of the invention. For example, the housing 12 can be dimensioned such that the interior chamber defined thereby is only large enough to accommodate the body of the animal for which the trap is intended. Thus, traps of different sizes would be used for mice than would be used for rats, it being understood that the scope of the invention is to be limited only by the definition provided by the appended claims.

The embodiments of the invention in which an exclusive property or privilege is claimed are defined as follows:

1. An animal trap, comprising:
   a housing defining an enclosure and having an entrance opening formed therein;
   a door member pivotally mounted with the enclosure to move between positions allowing closure of the entrance opening and access through said entrance opening;
   trigger means pivotally mounted within the enclosure to cam the door member into a position blocking access through the entrance opening; and,
   means for maintaining the door member in blocking relation to the entrance opening, therby to prevent the door member from moving to a position allowing access through the entrance opening after the door member has blocked access therethrough, wherein the trigger means comprise:
   a forward cam portion formed of a flat plate-like body member;
   an inclined plane portion formed of a flat plate-like body member, the portions joining each other at an obtuse angle; and,
   pivot means mounting the trigger means for pivotal movement within the enclosure at the juncture of said portions, the door member surmounting the forward cam portion and the enclosure when the trap is in the set position, an animal entering the trap and exerting force by virtue of its weight on the inclined plane portion causing the trigger means to pivot about the pivot means, the inclined plane portion moving downwardly within the enclosure and the forward cam portion moving upwardly to the cam the door member into blocking relation to the entrance, and
   wherein the maintaining means comprises a lateral ledge formed on the inner wall of the door member medially thereof, the ledge having a surface forming a shoulder which abuts the forward edge of the forward cam portion to prevent downward movement of the forward cam portion within the enclosure after the door member has blocked access to the entrance opening.

2. The trap of claim 1 wherein the trap is essentially used for the trapping of only one animal and is disposable with the entrapped animal, the trap further comprising bait means disposed within the enclosure in a portion thereof removed from the entrance opening.

3. The trap of claim 2 and further comprising:
   a strip of flat material disposed partially over the entrance opening prior to use of the trap to prevent access into the enclosure;
   adhesive means for maintaining the strip over the entrance opening.

4. The trap of claim 3 wherein the strip is elongated, at least one end thereof being attached to the rear portion of the housing and the other end being attached to the forward end of the housing below the entrance opening, the strip being detachable from the housing at at least one attachment location to allow access to the entrance opening, the strip remaining attached to the housing at the other attachment location to provide a handle by which the trap can be held.

5. The trap of claim 3 and further comprising tab means carried on the strip and extending into the entrance opening to preclude said door member from being moved into a position blocking said entrance opening.

6. An animal trap, comprising:
   a housing defining an enclosure and having an entrance opening formed therein;
   a door member pivotally mounted with the enclosure to move between positions allowing closure of the entrance opening and access through said entrance opening;
   trigger means pivotally mounted within the enclosure to cam the door member into a position blocking access through the entrance opening; and,
   means for maintaining the door member in blocking relation to the entrance opening, thereby to prevent the door member from moving to a position allowing access through the entrance opening after the door member has blocked access therethrough, wherein the trigger means comprise:
   a forward cam portion formed of a flat plate-like body member;
   an inclined plane portion formed of a flat plate-like body member, the portions joining each other at an obtuse angle; and,
   pivot means mounting the trigger means for pivotal movement within the enclosure at the juncture of said portions, the door member surmounting the forward cam portion and the inclined plane portion extending upwardly and rearwardly of the enclosure when the trap is in the set position, an animal entering the trap and exerting force by virtue of its weight on the inclined plane portion causing the trigger means to pivot about the pivot means, the inclined plane portion moving downwardly within the enclosure and the forward cam portion moving upwardly to cam the door member into blocking relation to the entrance opening, wherein the maintaining means comprises a pad of adhesive material the pad adhesively securing the rear edge portion of the inclined inclined plane portion in contact with the floor of the enclosure on movement of the inclined plane portion downwardly by the weight of an animal thereon.

7. The trap of claim 6 wherein the rear edge portion of the inclined plane portion is angled relative to the body member of said inclined plane portion the rear edge portion presenting a substantially horizontal surface of increased surface area for contact with the pad of adhesive material.

8. A single-use, disposable animal trap, comprising:
a housing defining an enclosure and having an entrance opening formed therein;
door means for said entrance opening; animal-operated trigger means within said enclosure for causing said door means to close said entrance opening when an animal has passed therethrough into said enclosure; and,
strip means having portions disposed over the entrance opening defining tab means engagable through said entrance opening to prevent premature closing of said door means.

9. The trap of claim 8 wherein said strip means is elongated and attached to the housing exterior surface portions thereof, at least one portion of the strip means being detachable from the housing to remove the tab means from the entrance opening, the strip means remaining attached to the housing at another portion thereof to provide a handle by which the trap can be held for disposal.

* * * * *